United States Patent [19]
Check et al.

[11] 3,788,198
[45] Jan. 29, 1974

[54] FLUID SUPPORTED RECTANGULAR SLIDE UNIT

[75] Inventors: John M. Check, Chelsea; Donald R. Brettrager, Chesaning, both of Mich.

[73] Assignee: Raycon Corporation, Ann Arbor, Mich.

[22] Filed: June 2, 1972

[21] Appl. No.: 259,019

[52] U.S. Cl............. 92/86, 92/117, 92/127, 92/177
[51] Int. Cl.................. F01b 15/02, F01b 31/00
[58] Field of Search... 92/86, 86.5, 117, 117A, 165 PR, 92/177, 181, 127

[56] References Cited
UNITED STATES PATENTS

| | | | |
|---|---|---|---|
| 1,613,904 | 1/1927 | Ritz-Woller | 92/177 X |
| 2,980,063 | 4/1961 | Litz | 92/117 X |
| 3,319,534 | 5/1967 | Boonshaft | 92/181 X |
| 3,631,766 | 1/1972 | Kraakman | 92/181 X |

FOREIGN PATENTS OR APPLICATIONS

| | | | |
|---|---|---|---|
| 869,585 | 3/1953 | Germany | 92/177 |

*Primary Examiner*—Irwin C. Cohen
*Attorney, Agent, or Firm*—Olsen and Stephenson

[57] ABSTRACT

A fluid supported rectangular slide unit in which a rectangular cylinder member is telescoped in a rectangular housing member, and fluid under pressure is introduced to produce relative reciprocal movement of the members. The pressure fluid is also utilized to form a layer of fluid between the members which promotes accurate relative positions of the members and facilitates relative movement. Such a slide unit is suitable for accurately positioning a machine tool where rotational displacement between the tool and a workpiece cannot be tolerated.

3 Claims, 5 Drawing Figures

FLUID SUPPORTED RECTANGULAR SLIDE UNIT

BACKGROUND OF THE INVENTION

During the operation of a machine tool it is sometimes desirable that the tool be restricted from rotational movement relative to the workpiece. Where several tools are mounted on a support to form a pattern to be engaged simultaneously, any rotation of the support would cause the pattern to be misaligned on the workpiece. Also it is desirable that every time the tool engages the workpiece the relative positioning of tool and workpiece be consistent and repeatable. The present invention provides a slide unit having general utility and particular usefulness as a machine tool carriage to achieve an accurate non-rotational engagement of the tool and the workpiece.

In the past, the carriage assemblies have employed a conventional hydraulic cylinder and piston assembly to lower and raise the tool to engage and disensgage the workpiece. If rotation was undesirable, a guide, external to the cylinder, was employed. Such guides, after repeated operations, required adjustments to compensate for wear and thus assure accuracy of rotational alignment. Because the alignment was achieved by mechanical contact of a guide, variations also resulted from temperature changes and contaminants on the surfaces of the guide and accurate repetition of alignment from day to day was difficult.

SUMMARY OF THE INVENTION

The present invention overcomes the problems of accurate, repetitive, rotational free alignment by using a rectangular slide unit in the carriage assembly of a machine tool. The slide unit consists of a rectangular cylinder and a supporting housing which are dimensioned as to have a gap between their mating surfaces. Pressurized fluid is introduced into the housing to achieve relative movement of the housing and cylinder, either of which can function as a movable slide. The pressurized fluid additionally flows into the gap between the and the housing and provides a medium which supports the cylinder within the housing, positions the cylinder within the housing so that there is no metal contact between the mating surfaces of the cylinder and the housing, and provides a fluid, self-lubricating medium on which the cylinder and housing can freely move relative to each other with repeatable precision and without wear. The pressure fluid in the housing stabilizes movement of the slide.

Other objects of this invention will appear in the following description and appended claims, reference being had to the accompanying drawings forming a part of this specification wherein like reference characters designate corresponding parts in the several views.

Figure 1:
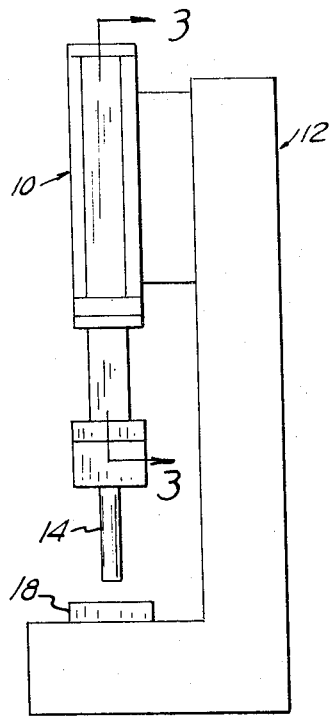
FIG. 1 is a side view of the slide unit of this invention mounted on a machine tool fixture.
Figure 2:
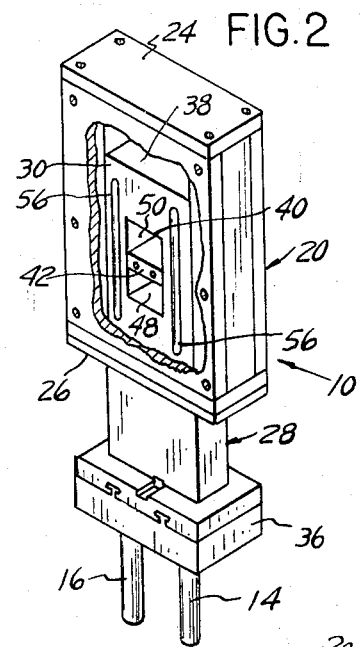
FIG. 2 is a perspective with a cutaway section of the slide unit.
Figure 3:
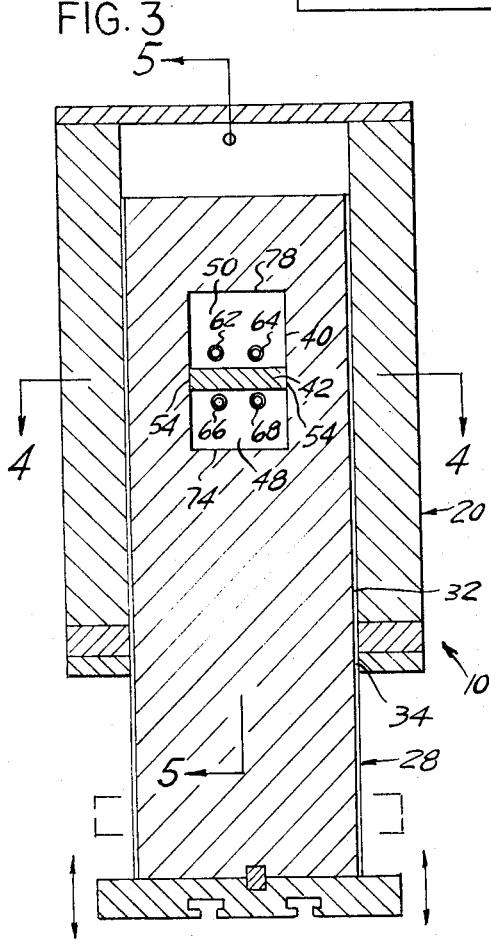
FIG. 3 is an enlarged sectional view of the slide unit of this invention as seen from the line 3—3 in FIG. 1.
Figure 5:
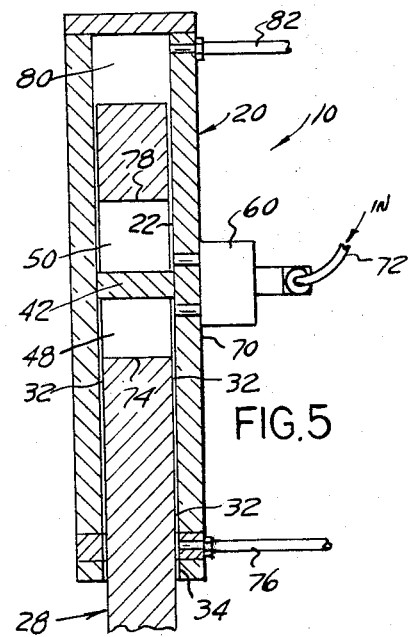
FIG. 5 is a reduced longitudinal sectional view of the slide unit as seen from the line 5—5 in FIG. 3.

With reference to the drawing, the slide unit of this invention, indicated generally at 10, is shown in FIG. 1 mounted on a frame 12 for moving tools 14 and 16, seen in FIG. 2 toward and away from a workpiece 18. With reference to FIG. 2, the slide unit 10 consists of a rectangular housing 20 with inner surfaces 22. The housing 20 is closed at its top end 24 and open at its lower end 26. A rectangular moving cylinder 28 with outer surfaces 30 telescopes into the housing 20 through the open end 26 and is dimensioned so that an essentially uniform width gap 32 exists between contiguous surfaces 22 and 30 of the housing 20 and cylinder 28, respectively. In FIGS. 3 and 5, a gasket 34 is shown attached to the housing 20 at its open end 26 to form a fluid tight seal between the housing 20 and the cylinder 28 at the lower end 26.

Figure 4:
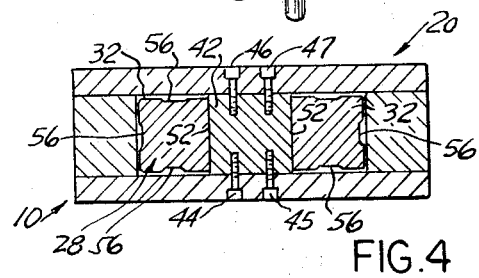
FIG. 4 is a transverse sectional view of the slide unit as seen from the line 4—4 in FIG. 3.

The cylinder 28 has machine tools 14 and 16, such as electrodes for electric discharge machining, attached at its lower end 36. Near the upper end 38, the cylinder 28 has a rectangular opening 40 through its depth. The opening 40 accommodates a cross or fixed piston member 42 which is rigidly attached to the opposite sides of the housing 20 as shown in FIG. 4 by means of screws 44–47. With reference to FIGS. 3–5, the cross piston member 42 divides the opening 40 into two chambers 48 and 50, and forms a fluid tight seal between the sides of the opening 40 and the cross piston member 42 at lines 52 in FIG. 4 and lines 54 in FIG. 3. Referring to FIGS. 2 and 4, the cylinder 28 also has elongated grooves 56 formed in its outer surfaces 30 which comprise part of the gap 32 between the contiguous surfaces 22 and 30 of the housing 20 and cylinder 28.

A control valve 60 is connected externally to the housing 20 and has inlet ports 62, 64, 66 and 68. The ports extend through the wall 70 of the housing 20 and terminate flush with a housing inner surface 22 with ports 62 and 64 opening into chamber 50 just above cross piston member 42 and ports 66 and 68 opening into chamber 48 just below cross piston member 42. With some suitable external fluid source such as a pump (not shown) attached to hose 72, pressurized fluid is switched by valve 60 alternately to flow into ports 62 and 64 or into ports 66 and 68.

In the operation of the unit 10, when pressurized fluid such as oil is introduced by means of valve 60 and ports 62 and 64 into chamber 50, the chamber 50 is expanded and the chamber 48 is contracted. This causes the 28 to move upward until the bottom edge 74 of the opening 40 contacts the cross piston member 42. Fluid from both chambers 48 and 50 is forced into the gap 32. The pressurized fluid flows into all portions of the gap 32 due to the pressure and finally through outlets 76 and 82. When the control valve switches the fluid flow into ports 66 and 68, the chamber 48 beings expanding in response thereto and the cylinder 28 moves downward until the upper edge 78 contacts the cross piston member 42. The fluid in chambers 48 and 50 is forced into the gap 32. This fluid under pressure flows into all portions of the gap 32 due to the pressure, fills top chamber 80, and flows through outlet 82, as well as outlet 76.

At all times after the slide unit 10 has been pressurized the gap 32 including grooves 56 is filled with pressurized fluid. The groove6 in the surfaces 30 of the cylinder 28 provide reservoirs so that sufficient volume of fluid or "head" is present within the gap to be pressurized. The grooves could be located on the inner surfaces 22 of the housing 20 if desired as long as the grooves are contiguous with an outer surface 20 of the cylinder 28 for all positions of travel of the piston.

Accurate position of the cylinder 28 relative to the housing 20 is achieved because at any point along the gap of a cross section such as shown in FIG. 4, the fluid pressure will be equal. The high perssure fluid thus acts to maintain the gap 32 at a uniform width, and thus cylinder 29 is positioned equidistant from the sides of the housing 20. The high pressure fluid also stabilizes cylinder movement. The fluid also provides a medium within the gap on which the piston and housing can move relative to each other without being in metal to metal contact. tThis provides a nearly frictionless travel with accurately repeatable characteristics.

What is claimed is:

1. A slide unit comprising a fixed housing member having an internal surface which is rectangular in cross section, a moving cylinder member having an external surface which is rectangular in cross section and is telescoped within said internal surface, fluid inlet means in said housing member, coacting means on said members including a fixed piston forming opposed working chambers in said moving cylinder member through which fluid under pressure from said fluid inlet means can flow to cause relative reciprocal movement of said surfaces, means in said housing member forming a gap between said surfaces, and means communicating said chambers and said gap providing for a constant supply of fluid under pressure to said gap so as to maintain a layer of fluid under pressure between said surfaces.

2. A slide unit comprising a fixed housing member having an internal surface which is rectangular in cross section, a moving cylinder member having an external surface which is rectangular in cross section and is telescoped within said internal surface, coacting means on said members forming chambers in said cylinder member through which fluid under pressure can flow to cause relative reciprocal movement of said surfaces, means in said housing member forming a gap between said surfaces, and means communicating said chambers and said gap providing for a constant supply of fluid under pressure to said gap so as to maintain a layer of fluid under pressure between said surfaces, said means forming said chambers comprising a rectangular opening in said cylinder member and a fixed piston member attached to said housing and extended through said opening in fluid tight relation with said cylinder member so as to divide said opening into a pair of chambers, and fluid inlet means on said housing on one side of said fixed piston member so that when fluid is introduced into said housing through said inlet means said reciprocal movement results, and said housing having outlet means at both ends so that said pressurized fluid flows from said inlet means through said gap to said outlet means mounted on both ends of said housing.

3. A slide unit as defined in claim 2, further including indentations on all from sides of said cylinder member communicating with said opening and providing fluid reservoirs within said gap for said pressurized fluid.

* * * * *

UNITED STATES PATENT OFFICE
CERTIFICATE OF CORRECTION

Patent No. 3,788,198  Dated January 29, 1974

Inventor(s) John M. Check et al.

It is certified that error appears in the above-identified patent and that said Letters Patent are hereby corrected as shown below:

Column 1, line 41, after "the", second occurrence, insert -- cylinder --. Column 2, line 47, after "the", first occurrence, insert -- cylinder --; line 53, "beings" should read -- begins --; line 63, "groove 6" should read -- grooves 56 --. Column 3, line 7, after "thus" insert -- the --; line 8, "29" should read -- 28 --; line 11, "piston" should read -- cylinder --. Column 4, line 27, "from" should read -- four --.

Signed and sealed this 20th day of August 1974.

(SEAL)
Attest:

McCOY M. GIBOSN, JR.
Attesting Officer

C. MARSHALL DANN
Commissioner of Patents